United States Patent
Minami et al.

[11] Patent Number: 6,060,691
[45] Date of Patent: May 9, 2000

[54] DEVICE FOR HEATING FLUID CONTROLLER

[75] Inventors: Yukio Minami; Nobukazu Ikeda; Michio Yamaji; Tsutomu Tanigawa, all of Osaka, Japan

[73] Assignee: Fujikin Incorporated, Osaka, Japan

[21] Appl. No.: 09/062,831

[22] Filed: Apr. 20, 1998

[30] Foreign Application Priority Data

Apr. 21, 1997 [JP] Japan ................................. 9-103394

[51] Int. Cl.⁷ ............................................... H05B 1/00
[52] U.S. Cl. ........................ 219/201; 219/528; 219/531; 219/535; 137/341
[58] Field of Search .................................. 219/535, 538, 219/202, 206, 205, 536, 476, 201, 301, 311, 537, 528, 540, 530; 392/303, 309, 311; 137/341, 315

[56] References Cited

U.S. PATENT DOCUMENTS

| | | | |
|---|---|---|---|
| 2,418,557 | 4/1947 | Reiser | 219/528 |
| 3,733,459 | 5/1973 | Longstroff | 219/201 |
| 4,313,048 | 1/1982 | Holbrook | 219/311 |
| 4,558,206 | 12/1985 | Ball | 219/301 |
| 5,413,139 | 5/1995 | Kusumoto et al. | 137/341 |

FOREIGN PATENT DOCUMENTS

| | | |
|---|---|---|
| 2 418 600 | 9/1979 | France . |
| 36 33 682 | 4/1988 | Germany . |
| 92 02 286 U | 4/1992 | Germany . |

OTHER PUBLICATIONS

Japan Abstract 04064788A, Feb. 28, 1992.

*Primary Examiner*—Teresa Walberg
*Assistant Examiner*—L Fastovsky
*Attorney, Agent, or Firm*—Armstrong Westerman Hattori McLeland & Naughton

[57] ABSTRACT

A device for heating a fluid controller comprises a pair of platelike side heaters pressed respectively against a pair of opposite side faces of a body of the fluid controller with an insulating layer provided between each heater and each side face, a pair of side holding members each having a recessed portion for fitting the side heater therein and fastened to each other with screws to hold the controller body therebetween from opposite sides of the body, and a cushion member interposed between each side heater and a bottom face of the recessed portion for pressing the side heater against the controller body side face.

5 Claims, 7 Drawing Sheets

DEVICE FOR HEATING FLUID CONTROLLER

BACKGROUND OF THE INVENTION

The present invention relates to a device for heating fluid controllers such as valves.

There are cases wherein fluid controllers, such as valves, for use in semiconductor manufacturing apparatus must be heated when a gas as converted from a fluid which is in the form of a liquid at room temperature is caused to flow without re-liquefaction. While a heating device comprising, for example, a tape heater is available, there arises a need to use a heating device specifically assembled as a unit along with the fluid controller to achieve a higher thermal efficiency and an improved work efficiency for installation.

Such a device specifically designed for heating a fluid controller is already known which comprises a tubular heater and a heat-conductive member provided in a clearance between the tubular heater and the body of the fluid controller (see JP-A No. 64788/1992).

The known heating device has the problem that the clearance between the tubular heater and the controller body, even when having the heat-conductive member therein, is liable to permit an air layer to be formed between the controller body and the conductive member as well as between the conductive member and the heater.

SUMMARY OF THE INVENTION

An object of the present invention is to provide a device for heating a fluid controller without permitting an air layer to be formed between the controller body and a heater of the device so as to achieve an improved thermal efficiency.

The present invention provides a device for heating a fluid controller which device comprises a pair of platelike side heaters pressed respectively against a pair of opposite side faces of a body of the fluid controller with an insulating layer provided between each heater and each side face, a pair of side holding members each having a recessed portion for fitting the side heater therein and fastened to each other with screws to hold the controller body therebetween from opposite sides of the body, and a cushion member interposed between each side heater and a bottom face of the recessed portion for pressing the side heater against the controller body side face.

Preferably, each side heater is a constant-temperature heat generator having an automatic temperature control function for giving a constant temperature merely when a voltage is applied to the heat generator.

With the heating device of the invention, the side heater can be pressed against the side face of the controller body by the cushion member without interposing a separate heat-conductive member between the body and the side heater. This eliminates the air layer to be otherwise formed between the controller body and the heater to achieve an improved thermal efficiency.

Preferably, the heating device further comprises a plate-like bottom heater pressed against a bottom surface of the controller body with an insulating layer provided therebetween, a bottom holding member having a recessed portion for fitting the bottom heater therein and fastened to the bottom surface of the controller body with screws, and a cushion member interposed between the bottom heater and a bottom face of the recessed portion of the bottom holding member for pressing the bottom heater against the controller body bottom surface. The device then achieves a further improved thermal efficiency since the fluid controller body can be heated also from the bottom side thereof. The heating device of this construction is suitable when the fluid controller has at its lower portion an inlet-outlet pipe coupling which makes it difficult to fit a side heater to the side face of the body lower portion.

The insulating layer may be formed by coating the surface of the heater with an insulating film or by interposing an insulating sheet of silicone or the like between the controller body and the heater. Alternatively, a thin aluminum sheet may be used which has an anodic oxide coating over the surface to assure insulation by the coating, with the aluminum serving to transfer heat from the heater to the controller body more efficiently. The insulating sheet, heater and cushion member can be fastened to the holding member by inserting each of screws, such as small countersunk head screws, through respective corresponding screw holes formed in the sheet, heater and cushion member and driving the screw into a corresponding threaded bore formed in the bottom of the heater accommodating recessed portion of the holding member. Preferably, the heater is recessed from its surface around the screw hole to provide a clearance between the head of the screw and the body to ensure insulation.

When the device has three heaters, i.e., a pair of side heaters and a bottom heater, the three heaters are connected together in parallel, or the side heaters are connected in series with each other, with the bottom heater connected in parallel with the side heaters. To diminish the rush current (maximum current flowing after the application of voltage), it is desired to connect the side heaters in series with each other and connect the bottom heater in parallel with the side heaters.

DESCRIPTION OF THE PREFERRED EMBODIMENTS

Embodiments of the invention will be described below with reference to the drawings. In the following description, the terms "left" and "right" refer respectively to the left-hand side and the right-hand side of FIG. 3, and the front side of the plane of drawing of FIG. 3 will be referred to as "front," and the rear side thereof as "rear."

Figure 1:
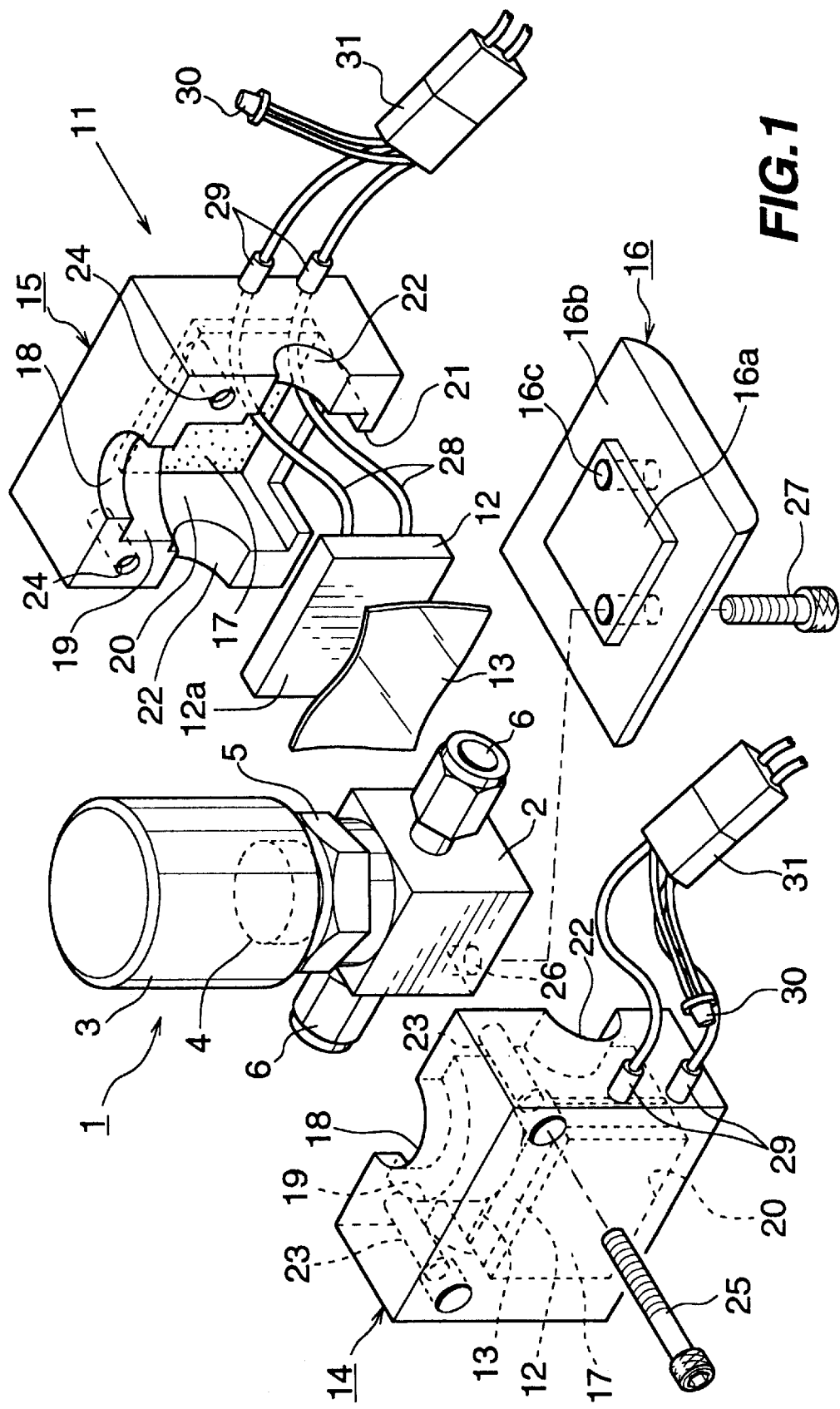
FIG. 1 is an exploded perspective view showing a first embodiment of the invention, i.e., a fluid controller heating device.
Figure 2:
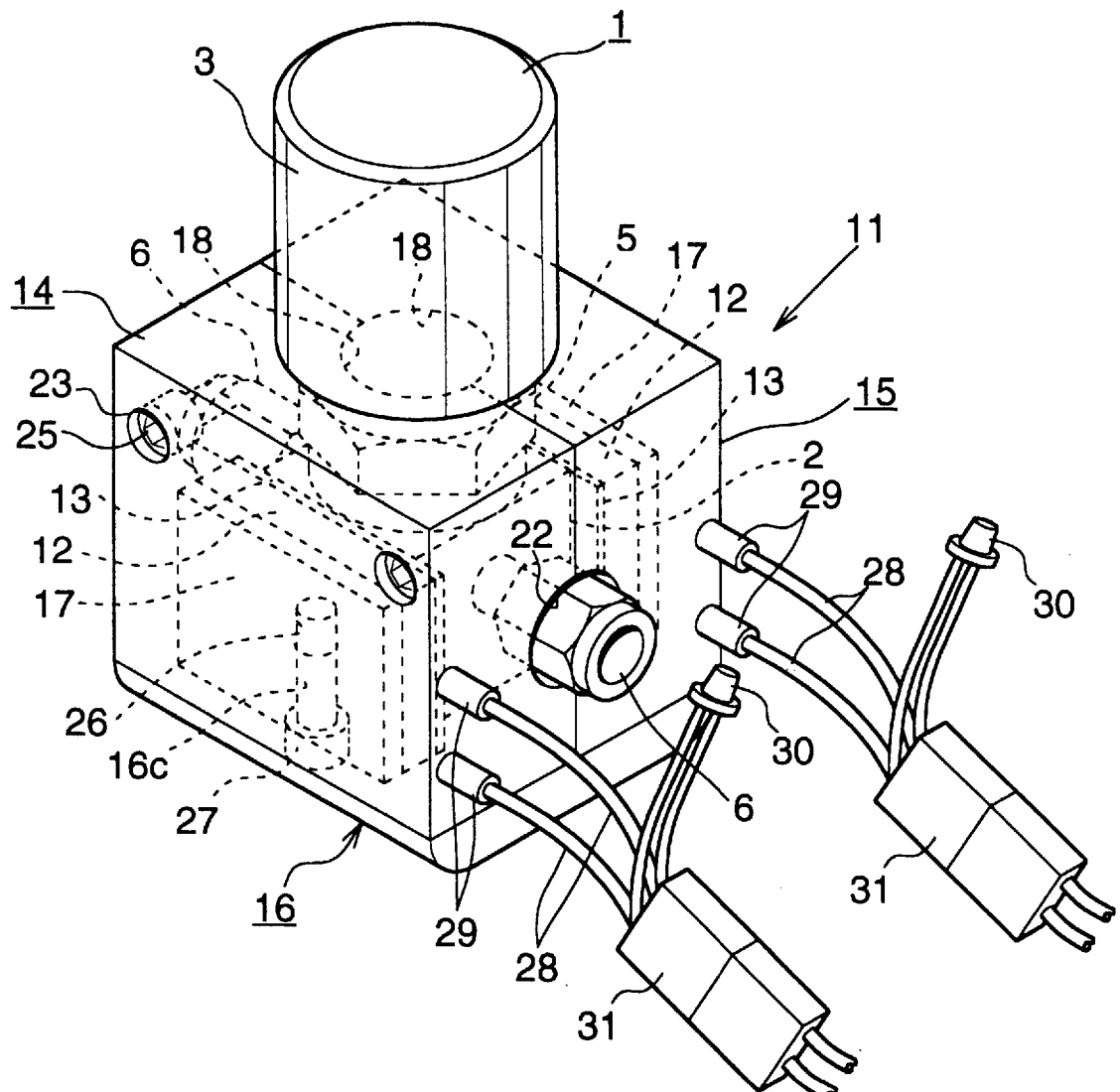
FIG. 2 is a perspective view of the heating device as assembled.
Figure 3:
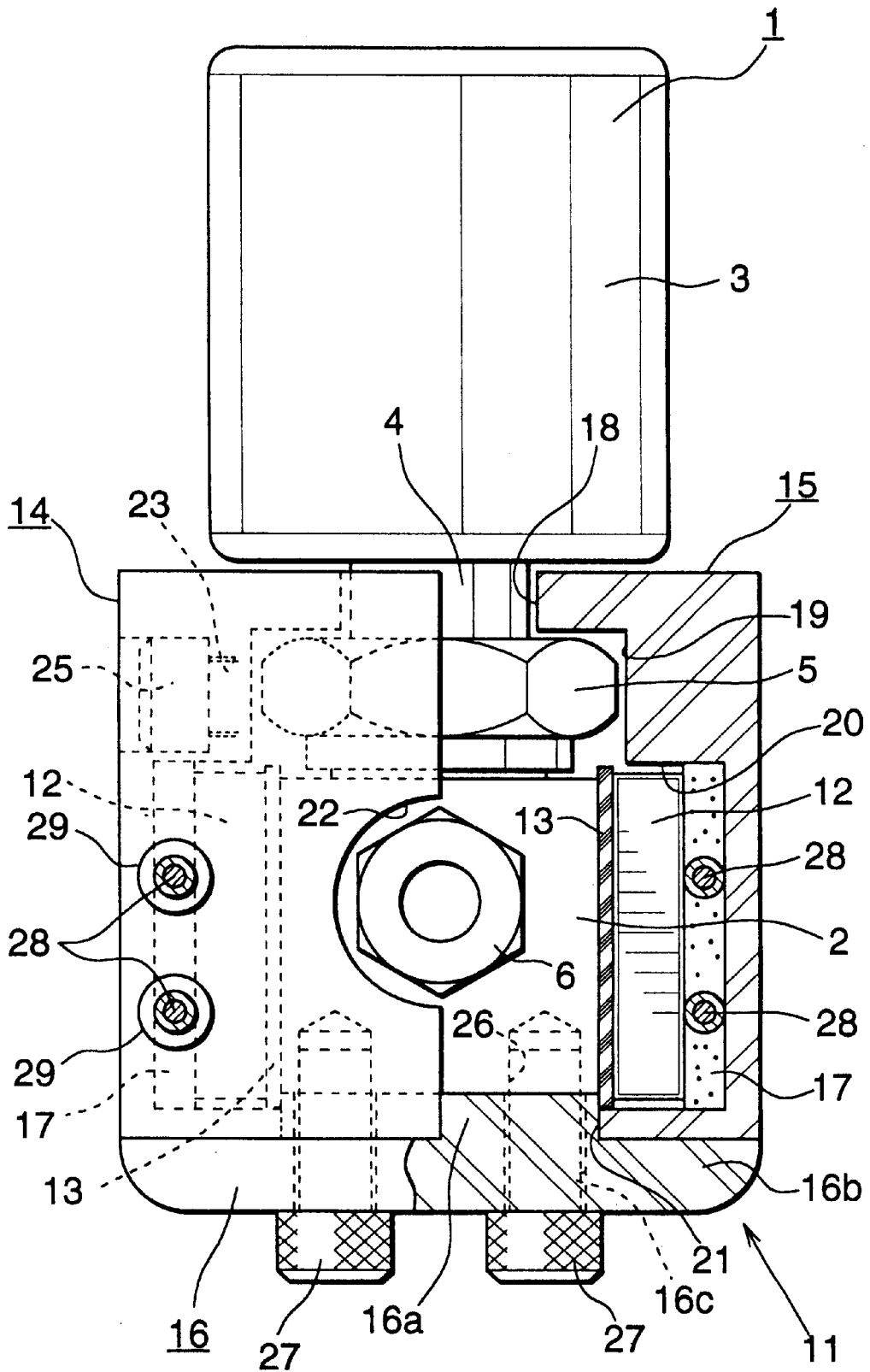
FIG. 3 is a front view partly broken away and showing the heating device.

FIGS. 1 to 3 show a first embodiment of the invention, i.e., a fluid controller heating device 11.

With reference to these drawings, the fluid controller 1 to be heated comprises a body 2 in the form of a rectangular parallelepipedal block, and a hollow cylindrical actuator case 3 provided on the top of the body 2 and housing an actuator assembly. The body 2 is connected to the actuator assembly by a bonnet having one end inserted in and supported by the actuator case 3 and the other end inserted in the body 2 and fastened by a cap nut 5. The bonnet 4 is partly left exposed immediately above the cap nut 5. Provided on the front and rear sides of the body 2 are respective inlet-outlet pipe couplings 6, 6 in communication with a channel inside the body 2.

The heating device 11 comprises left and right side heaters 12 each in the form of a plate and pressed against the respective left and right side faces of the fluid controller body 2 with an insulating silicone sheet 13 interposed therebetween, left and right holding members 14, 15 fastened to each other for holding the respective side heaters 12 and holding the body 2 therebetween from opposite sides, and a bottom holding member 16 in the form of a horizontal plate and comprising a projecting center portion 16a fitted to the bottom surface of the body 2 and an outer peripheral portion 16b rectangular in horizontal section and fitted to the bottom surfaces of the holding members 14, 15.

The holding members 14, 15 and the bottom holding member 16 are made of thermoplastic reinforced polyester resin.

Each of the left and right holding members 14, 15 is generally in the form of a rectangular parallelepipedal block and has an upper surface positioned at the upper end of the exposed bonnet portion 4, with its bottom surface slightly projecting downward beyond the bottom surface of the body 2. Each holding member 14 (15) is formed in its side opposed to the controller body 2 with recessed portions as arranged from above downward, i.e., a recessed portion 18 semicircular in horizontal section for accommodating the exposed bonnet portion 4, a recessed portion 19 semicircular in horizontal section for accommodating the cap nut 5, a recessed portion 20 rectangular in horizontal section for accommodating the side heater 12, and a recessed portion 21 rectangular in horizontal section for accommodating the center portion 16a of the bottom holding member 16. The holding member 14 (15) is further formed in the same side with recessed portions 22 semicircular in vertical section for accommodating the respective pipe couplings 6, the recessed portions 22 being formed in the respective front and rear walls of the holding member 14 (15) in communication with the heater accommodating recessed portion 20.

The left holding member 14 has bolt holes 23 extending laterally therethrough. The right holding member 15 has lateral threaded bores 24. A socket head bolt 25 is inserted from the left side of the left holding member 14 through each bolt hole 23 and screwed into the threaded bore 24 of the right holding member 15, whereby the opposed holding members 14, 15 are fastened to each other. The bottom holding member 16 has bolt holes 16c, and socket head bolts 27 are inserted from below the member 16 through the respective bolt holes 16c and screwed into respective threaded bores 26 formed in the bottom of the controller body 2, whereby the bottom holding member 16 is fastened to the body 2. Thus, the portions 2, 4 and 5 of the fluid controller 1 other than the actuator case 3 and inlet-outlet pipe couplings 6 are covered with the left and right holding member 14, 15 and the bottom holding member 16.

The recessed portions 18 and 19 for accommodating the exposed bonnet portion 4 and the cap nut 5 are so dimensioned as to form a small clearance between each holding member 14 (15) and the exposed bonnet portion 4 and the cap nut 5. A clearance larger than the combined thickness of the insulating sheet 13 and the side heater 12 is formed between the bottom face of each side heater accommodating recessed portion 20 and the side face of the controller body 2 opposed thereto. A cushion member 17 in the form of a silicone sponge mat is disposed between the bottom face and the side heater 12. The cushion member 17 has cushioning properties, heat-insulating properties and such a thickness that when the left and right holding members 14, 15 are fastened to each other by the socket head bolts 25, the cushion member 17 is thinned to give an elastic force to press the side heater 12 against the side face of the fluid controller body 2. The cushion member 17 therefore eliminates an air layer which would otherwise be present between the body 2 and the side heater 12 and which would impede the rise of temperature.

Each of the side heaters 12 is a constant-temperature heat generator having an automatic temperature control function for giving a constant temperature merely when a voltage is applied thereto. Accordingly there is no need to additionally use temperature adjusting means such as a thermostat which is required when a Nichrome heater is used, nor is there any likelihood of an abnormal rise in temperature or a break in the wiring of the heater itself. Available as such a heat generator is "Posistor" manufactured by Murata Mfg. Co. Ltd. The side heater 12 is coated with a 30-micrometer-thick Teflon insulating layer 12a over the front surface (opposed to the controller body 2) and rear surface thereof. The Teflon insulating layer 12a over the front surface of the side heater 12 and the insulating sheet 13 provide a double insulation structure between the controller body 2 and the side heater 12 to ensure improved safety.

Lead wires 28 for each side heater 12 are soldered to the rear side of the heater 12. Inside the heater accommodating recessed portion 20, the wires 28 are held between the rear side of the heater 12 and the cushion member 17. The lead wires 28 extend outward through respective bores extending through the front wall of the holding member 14 (15) and communicating with the recessed portion 20, and are supported by cable clamps 29 on the front wall of the holding member 14 (15). Even if pulled from outside, the lead wires 28 therefore will not be removed from the side heater 12 at the soldered portion. The lead wires 28 are connected by a connector 31 to a power supply cable having a fuse for blocking excessive current. Also attached to the connector 31 are lead wires for a neon lamp 30 for indicating energization of the heater 12 to the operator.

The left and right holding members 14, 15 can be attached to the left and right sides of the fluid controller 1 without interfering with the inlet-outlet pipe couplings 6 of the controller 1, so that the heating device 11 can be installed without removing piping connected to the couplings 6.

The bottom holding member 16 may be used only when there is a need to suppress the dissipation of heat from the bottom of the controller body 2. Furthermore, a heat-insulating material may be attached to the outer surfaces of the left and right holding members 14, 15 and the inner and outer surfaces of the bottom holding member 16 to give the fluid controller 1 improved heat-insulating properties and a higher heating temperature. The insulating silicone sheet 13 may be replaced by an aluminum plate formed with a 30-micrometer-thick anodic oxide coating over its surface. The oxide coating then affords insulation, while the aluminum plate which has high thermal conductivity can be heated in its entirety by the side heater 12, permitting heat to be transferred to the controller body 2 over a wide area to produce an improved heating effect.

Figure 4:
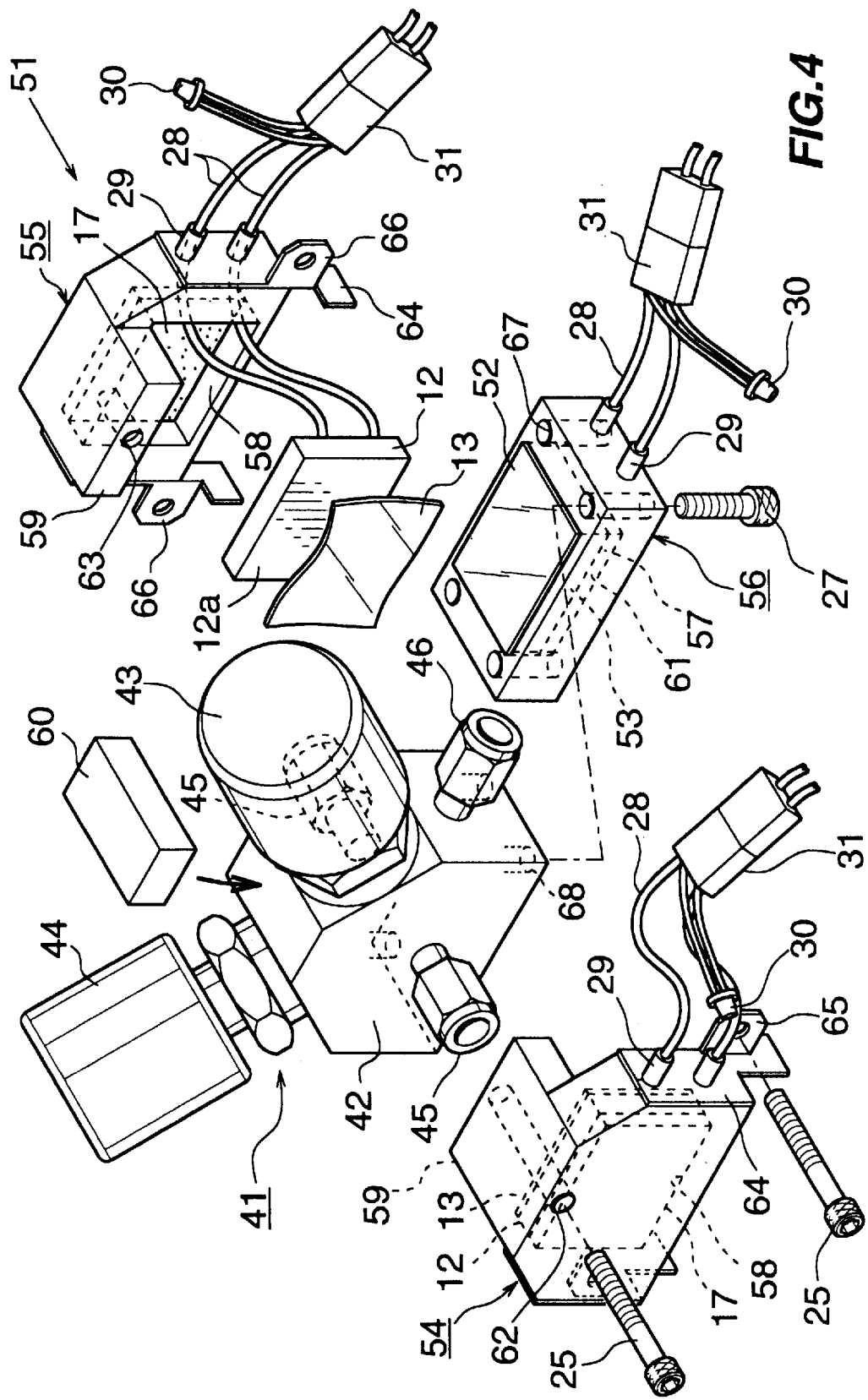
FIG. 4 is an exploded perspective view showing a second embodiment of the invention, i.e., another fluid controller heating device.
Figure 5:
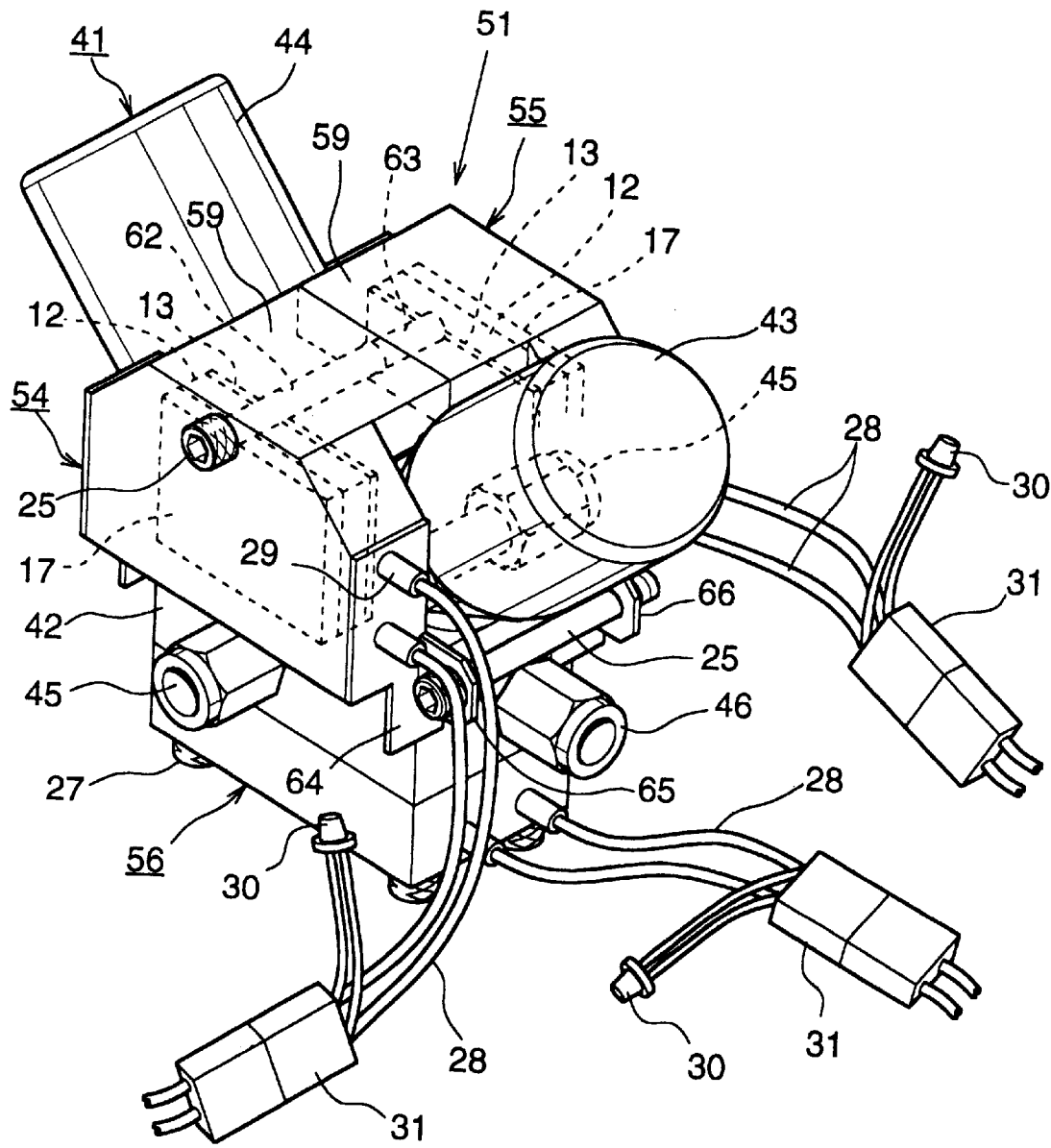
FIG. 5 is a perspective view of the heating device as assembled.
Figure 6:
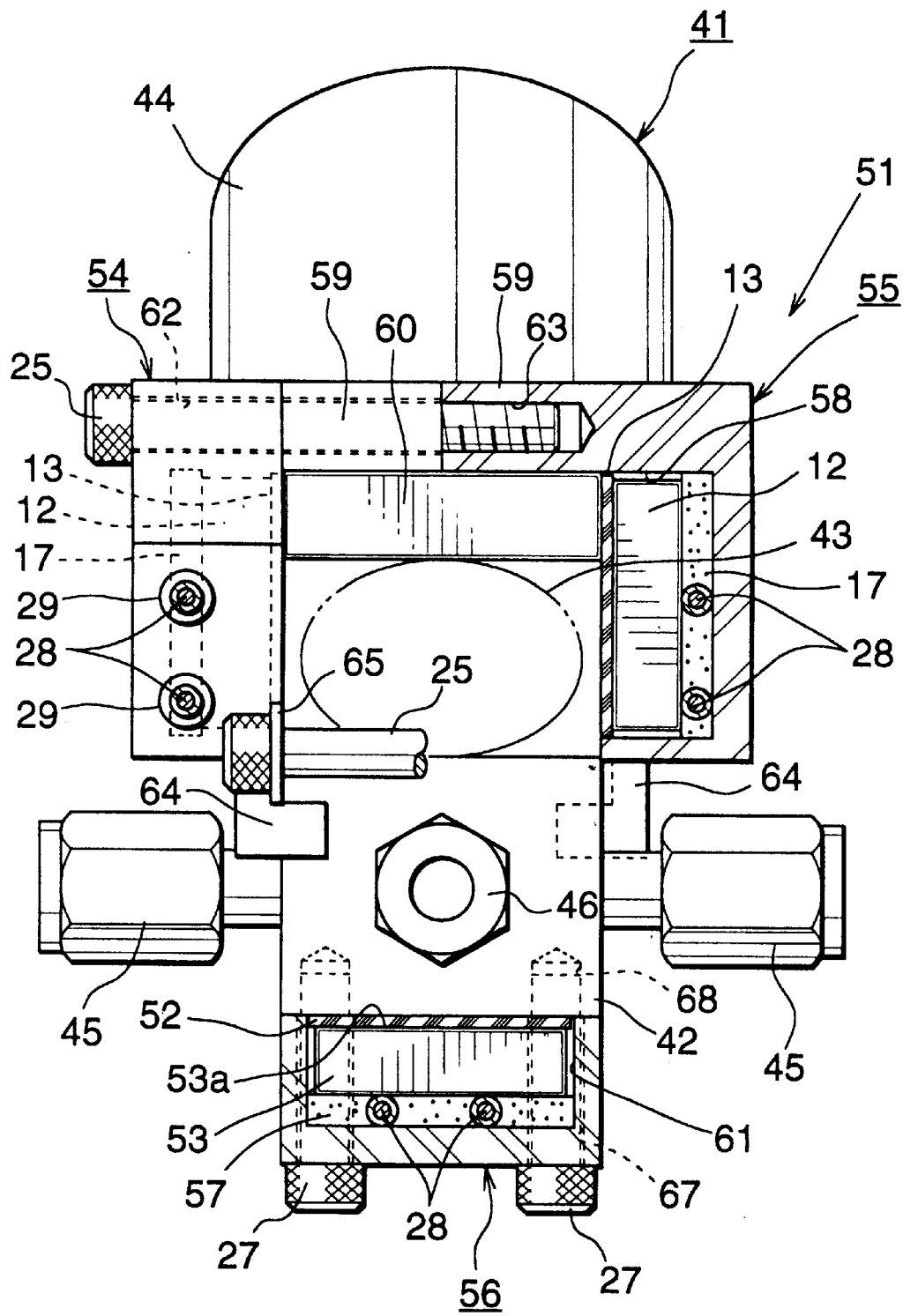
FIG. 6 is a front view partly broken away and showing the heating device.

FIGS. 4 to 6 show a second embodiment of the invention, i.e., a fluid controller heating device 51.

As illustrated, the fluid controller 41 to be heated has a blocklike body 42 pentagonal in vertical section and having left and right side faces, front and rear faces, a top face with a short front-to-rear width, a bottom face having a long front-to-rear width and front and rear slopes between the top face and the front and rear faces, two hollow cylindrical actuator cases 43, 44 mounted respectively on the front and rear slopes of the body 42 and each housing an actuator assembly, left and right inlet-outlet pipe couplings 45 attached to the left and right side lower portions of the body 42, and a front inlet-outlet pipe coupling 46 attached to the center of the front face of the body 42.

The heating device 51 comprises left and right platelike side heaters 12 pressed against the respective left and right side faces of the fluid controller body 42 with an insulating sheet 13 interposed therebetween, left and right holding members 54, 55 fastened to each other for holding the respective side heaters 12 and holding therebetween the controller body 42 at the portion thereof above the couplings 45 from opposite sides, a platelike bottom heater 53 pressed against the bottom face of the controller body 42 with an insulating sheet 52 interposed therebetween and a bottom holding member 56 fastened to the bottom of the body 42 for holding the bottom heater 53.

The side heaters 12 and the bottom heater 53 have the same construction as the side heater 12 of the first embodiment.

The left and right holding members 54, 55 and the bottom holding member 56 are made of a thermoplastic reinforced polyester resin.

The left and right holding members 54, 55 are each in the form of a block pentagonal in vertical section and shaped in conformity with the shape of the portion of the controller body 42 above the pipe couplings 45, and each have an upper surface projecting upward beyond the top face of the controller body 42. Each holding member 54 (55) is formed in the side thereof opposed to the body 42 with a rectangular parallelepipedal recessed portion 58 for accommodating the side heater 12. Each of the holding members 54, 55 has an extension 59 projecting toward the other holding member without interfering with the two actuator cases 43, 44 of the controller 41. The extensions 59 of the holding members 54, 55 have outer ends butting against each other. The lower faces of the extensions 59 and the top face of the body 42 define a clearance, in which a spacer 60 in the form of a rectangular parallelepipedal block is disposed.

The bottom holding member 56 is in the form of a rectangular parallelepipedal block having the same shape in horizontal section as the bottom face of the body 42. A rectangular parallelepipedal recessed portion 61 for accommodating the bottom heater 53 is formed in the upper side of the holding member 56.

The upper portion of the left holding member 54 is formed with a bolt hole 62 extending through its extension 59 laterally, while the right holding member 55 has a threaded bore 63 extending into the extension 59 thereof laterally. A socket head bolt 25 is inserted from the left side of the left holding member 54 through the hole 62 and screwed into the threaded bore 63 of the right holding member 55. The left and right holding members 54, 55 have brackets 64 on their front and rear faces for fastening the two members together. The brackets 64 on the left holding member 54 each have a lug 65 formed with a hole for passing a socket head bolt 25 therethrough. The brackets 64 on the right holding member 55 each have a lug 66 formed with a threaded bore for a socket head bolt 25 to be screwed in. Thus, the opposed holding members 54, 55 are fastened to each other with the three socket head bolts 25. The bottom holding member 56 has bolt holes 67 extending therethrough vertically. Socket head bolts 27 are inserted through these holes 67 from below the member 56 and screwed into threaded bores 68 formed in the bottom of the controller body 42, whereby the bottom holding member 56 is fastened to the body 42. In this way, the left and right holding members 54, 55 and the bottom holding member 56 cover the controller body 42 without interfering with the actuator cases 43, 44 and the inlet-outlet pipe couplings 45, 46.

A clearance larger than the combined thickness of the insulating sheet 13 and the side heater 12 is formed between the bottom face of each side heater accommodating recessed portion 58 and the side face of the controller body 42 opposed thereto. A cushion member 17 in the form of a silicone sponge mat is disposed between the bottom face of the recessed portion 58 and the side heater 12. The recessed portion 58, insulating sheet 13, side heater 12 and cushion member 17 all have the same size when seen from one side. The cushion member 17 has cushioning properties, heatinsulating properties and such a thickness that when the left and right holding members 54, 55 are fastened to each other by the socket head bolts 25, the cushion member 17 is thinned to give an elastic force to press the side heater 12 against the side face of the fluid controller body 42. The cushion member 17 therefore eliminates an air layer which would otherwise be present between the body 42 and the side heater 12 and which would impede the rise of temperature. Furthermore, a clearance larger than the combined thickness of the insulating sheet 52 and the bottom heater 53 is formed between the bottom face of the bottom heater accommodating recessed portion 61 and the bottom face of the controller body 42. A cushion member 57 in the form of a silicone sponge mat is disposed between the bottom face of the recessed portion 61 and the bottom heater 53. The cushion member 57 has cushioning properties, heat-insulating properties and such a thickness that when the bottom holding member 56 is fastened to the bottom of the controller body 42 by the socket head bolts 27, the cushion member 57 is thinned to give an elastic force to press the bottom heater 53 against the bottom face of the fluid controller body 42. The cushion member 57 therefore eliminates an air layer which would otherwise be present between the body 42 and the bottom heater 53 and which would impede the rise of temperature.

The bottom heater 53 is provided with lead wires 28, etc. which are the same as like parts of the first embodiment. Accordingly such parts are designated by like reference numerals and will not be described again.

The heating device 51 described is adapted to heat the controller body 42 at three sides, i.e., the left and right opposite sides and the bottom side and therefore achieves an improved thermal efficiency. However, the bottom heater 53 and the bottom holding member 56 are not always necessary. When to be attached, the bottom holding member 56 is installed before piping.

The left and right holding members 54, 55 can be attached to the left and right sides of the fluid controller 41 without interfering with the actuator cases 43, 44 and the inlet-outlet pipe couplings 45, 46 of the controller 41, so that these holding members 54, 55 can be installed without the necessity of removing the piping connected to the pipe couplings 45, 46.

With the second embodiment, the fluid controller body 42 is controlled to a specified temperature preferably by the on-off control of voltage using a temperature controller. Examples of useful sensors for temperature control are a platinum thin-film sensor and sheathed K-type thermocouple. In connecting the pair of side heaters 12 and the bottom heater 53 to the power source, it is desirable, for example, to connect the three heaters in parallel, or to connect two heaters in series with each other and connect the remaining heater in parallel with the two heaters. More preferably, the pair of side heaters 12 are connected in series with each other, and the bottom heater 53 is connected in parallel with the side heaters.

The insulating sheet 13 (52), heater 12 (53) and cushion member 17 (57) are accommodated in the recessed portion 20 (58, 61) of the holding member 14 (15, 54, 55, 56) according to the first and second embodiments. It is desired that these parts be fastened to the holding member 14 (15, 54, 55, 56) in the following manner.

Figure 7:
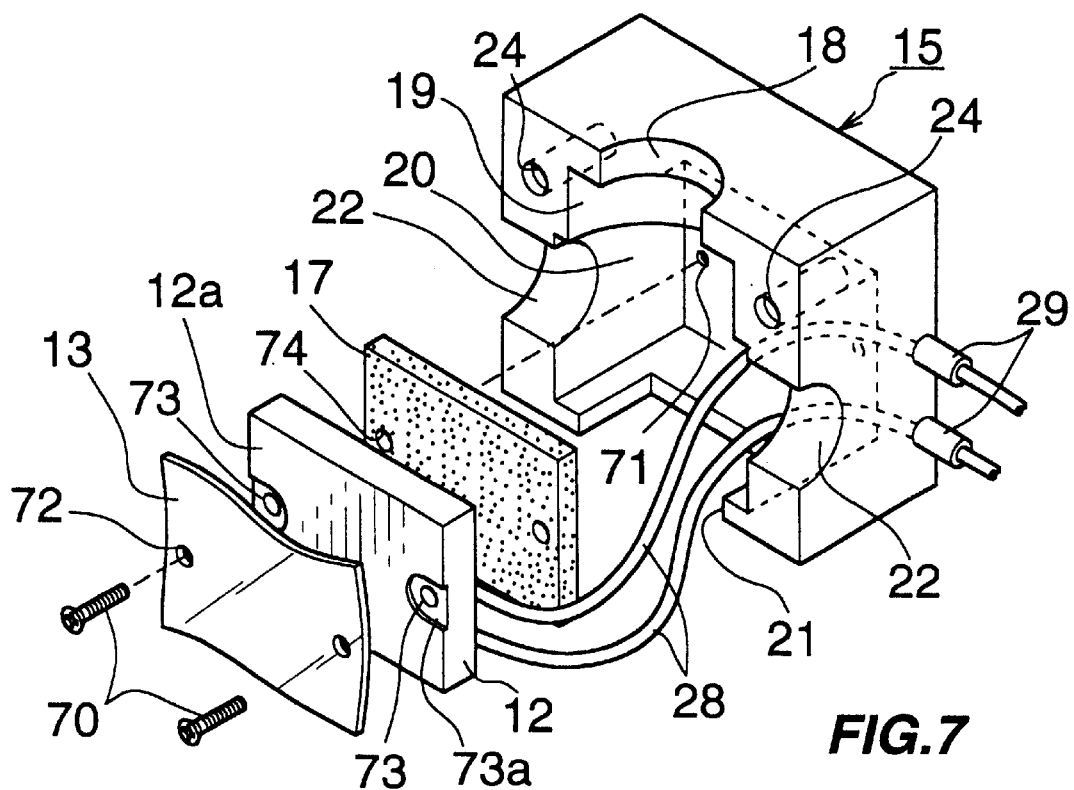
FIG. 7 is an exploded perspective view showing preferred heater fastening means for use in the heating device of the invention.
Figure 8:
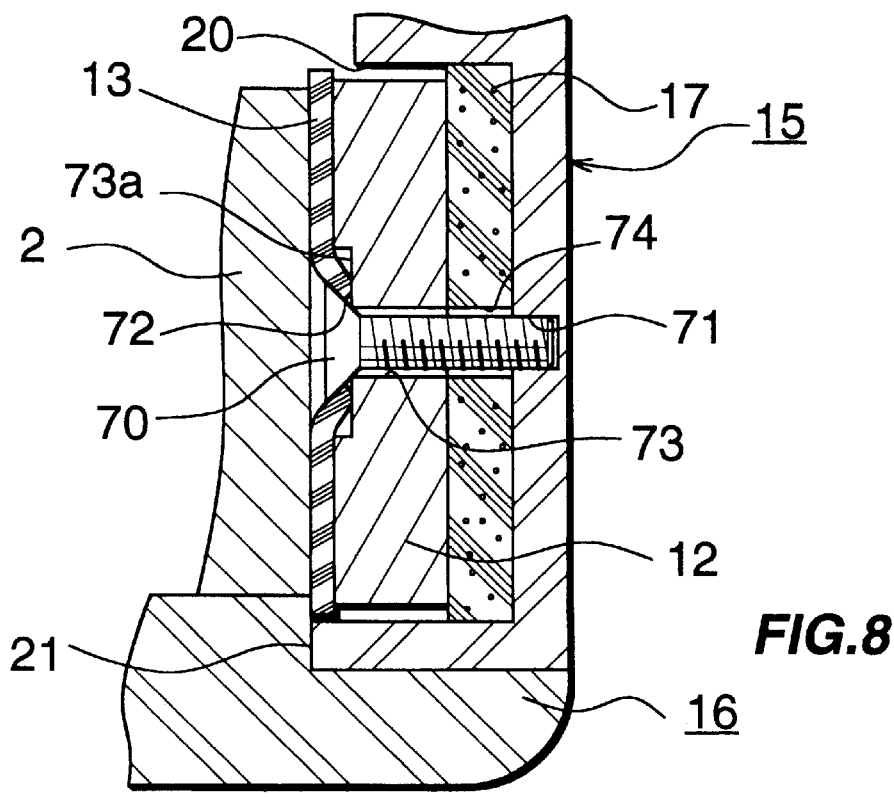
FIG. 8 is a sectional view of the same.

With reference to FIGS. 7 and 8, front and rear two threaded bores 71 extending laterally are formed in the bottom of the heater accommodating recessed portion 20 of the holding member 15, and screw holes 72, 73, 74 corresponding to the bores 71 are formed in the insulating sheet 13, heater 12 and cushion member 17, respectively. Small countersunk head screws 70 are inserted through the insulating sheet 13 and heater 12 and driven in the threaded bores 71 in the holding member 15. The side heater 12 is recessed from its surface around each screw hole 73 as indicated at 73a to form a clearance between the head of the screw 70 and the controller body 2 as seen in FIG. 8 to ensure insulation. The thickness of the cushion member 17 as fastened in place by screws 70 is adjusted by varying the amount of tightening of the screws 70 to thereby adjust the elastic force of the cushion member 17 pressing the heater 12 against the controller body 2.

What is claimed is:

1. A device for heating a fluid controller which device comprises a pair of platelike side heaters pressed respectively against a pair of opposite side faces of a body of the fluid controller with an electrical insulating layer provided between each heater and each side face, a pair of side holding members each having a recessed portion for fitting the side heater therein and fastened to each other with screws to hold the controller body therebetween from opposite sides of the body, and a cushion member interposed between each side heater and a bottom face of the recessed portion for pressing the side heater against the controller body side face.

2. A device for heating a fluid controller according to claim 1 wherein each side heater is a constant-temperature heat generator having an automatic temperature control function for giving a constant temperature merely when a voltage is applied to the heat generator.

3. A device for heating a fluid controller according to claim 1 which further comprises a platelike bottom heater pressed against a bottom surface of the controller body with an electrical insulating layer provided therebetween, a bottom holding member having a recessed portion for fitting the bottom heater therein and fastened to the bottom surface of the controller body with screws, and a cushion member interposed between the bottom heater and a bottom face of the recessed portion of the bottom holding member for pressing the bottom heater against the controller body bottom surface.

4. A device for heating a fluid controller according to claim 3 wherein the bottom heater is a constant-temperature heat generator having an automatic temperature control function for giving a constant temperature merely when a voltage is applied to the heat generator.

5. A device for heating a fluid controller according to claim 4 wherein the side heaters are connected in series with each other, and the bottom heater is connected in parallel with the side heaters.

* * * * *